United States Patent [19]

Searfoss

[11] Patent Number: 5,462,102
[45] Date of Patent: Oct. 31, 1995

[54] ADJUSTABLE ROLLING SAW STAND

[76] Inventor: William A. Searfoss, R.R. 7 Box 22, Bloomsburg, Pa. 17815

[21] Appl. No.: 285,109

[22] Filed: Aug. 3, 1994

[51] Int. Cl.⁶ .................................................... B25H 1/02
[52] U.S. Cl. .............. 144/287; 144/286 R; 269/289 MR
[58] Field of Search ........................... 269/289 MR, 901; 144/286 R, 286 A, 287; 83/477.2, 578

[56] References Cited

U.S. PATENT DOCUMENTS

| | | | |
|---|---|---|---|
| 3,787,039 | 1/1974 | Zeichman | 269/289 MR |
| 4,640,326 | 2/1987 | Hewitt | 269/289 MR |
| 4,852,623 | 8/1989 | Rodrigues | 144/287 |

*Primary Examiner*—W. Donald Bray

[57] ABSTRACT

An adjustable rolling saw stand comprising of a stand having a planar upper surface constituting a base for the removable receipt of a saw to be used for cutting material, the upper surface being formed in a rectangular configuration, a plurality of legs secured at their upper ends to the base, and lower ends positionable on the ground. A support assembly located on opposite sides of the base, each support assembly having a pair of pivot arms pivotally secured at their inboard ends to an adjacent pair of legs at an intermediate extent thereof for movement between an elevated operative position and a lower depending position. A locking assembly located on each side of the base, each locking assembly having a pair of locking arms for each support assembly each pair of locking arms having exterior ends pivotally secured to an intermediate extent of the pivot arms, the locking arms having interior ends with hooks with receiving slots secured to adjacent corners of the base for receiving the hooks when the pivot arms are in the elevated position and for removal thereof when the pivot arms are in the lower position.

1 Claim, 4 Drawing Sheets 5,462,102

ADJUSTABLE ROLLING SAW STAND

BACKGROUND OF THE INVENTION

1. Field of the Invention

The present invention relates to an adjustable rolling saw stand and more particularly pertains to supporting a large piece of material to be cut by a saw on a stand wherein rollers at the ends of arms are used for allowing easy handling of the material to be cut and, in an other orientation, employing such rollers for transporting the stand.

2. Description of the Prior Art

The use of saw stands of a wide variety of designs and configurations is known in the prior art. More specifically, saw stands of a wide variety of designs and configurations heretofore devised and utilized for the purpose of handling material to be cut on saw stands on a large number of designs and configurations are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,115,847 to Taber an adjustable support apparatus for table saws.

U.S. Pat. No. 4,964,450 to Hughes discloses an extension for table saw.

U.S. Pat. No. 4,798,113 to Viazanko discloses an extension table apparatus for power saw.

U.S. Pat. No. 4,852,623 to Rodrigues discloses an extension table for a table saw.

U.S. Pat. No. 4,259,887 to Dean discloses a table saw miter gauge extension.

In this respect, the adjustable rolling saw stand according to the present invention substantially departs from the conventional concepts and designs of the prior art, and in doing so provides an apparatus primarily developed for the purpose of supporting a large piece of material to be cut by a saw on a stand wherein rollers at the ends of arms are used for allowing easy handling of the material to be cut and, in an other orientation, employing such rollers for transporting the stand.

Therefore, it can be appreciated that there exists a continuing need for a new and improved adjustable rolling saw stand which can be used for supporting a large piece of material to be cut by a saw on a stand wherein rollers at the ends of arms are used for allowing easy handling of the material to be cut and, in an other orientation, employing such rollers for transporting the stand. In this regard, the present invention substantially fulfills this need.

SUMMARY OF THE INVENTION

In view of the foregoing disadvantages inherent in the known types of saw stands of a wide variety of designs and configurations now present in the prior art, the present invention provides an improved adjustable rolling saw stand. As such, the general purpose of the present invention, which will be described subsequently in greater detail, is to provide a new and improved adjustable rolling saw stand and method which has all the advantages of the prior art and none of the disadvantages.

To attain this, the present invention essentially comprises an adjustable rolling saw stand comprising: a stand having a planar upper surface constituting a base for the removable receipt of a saw to be used for cutting material, the upper surface being formed in a rectangular configuration with a short downwardly extending peripheral skirt in a rectangular configuration, a plurality of legs secured at their upper ends to the surface and skirt and lower ends positionable on the ground, a plurality of cross rods secured in a rectangular configuration at intermediate points of the legs to couple the legs for additional support; a support assembly located on opposite sides of the base, each support assembly having a pair of pivot arms pivotally secured at their inboard ends to an adjacent pair of legs at an intermediate extent thereof for movement between an elevated operative position and a lower depending position; a locking assembly located on each side of the base, each locking assembly having a pair of locking arms for each support assembly each pair of locking arms having exterior ends pivotally secured to an intermediate extent of the pivot arms with a support rod therebetween, the locking arms having interior ends with hooks with receiving slots secured to adjacent corners of the base for receiving the hooks when the pivot arms are in the elevated position and for removal thereof when the pivot arms are in the lower position; a pair of rollers, each roller secured between the exterior ends of each pair of pivot arms whereby, when the pivot arms are in the elevated position, the rollers may be used for supporting material to be cut to assist a user in the handling thereof, and when the pivot arms are in the lower position, the rollers are adapted to rest on a floor beneath the lower ends of the legs to assist in the rolling of the device from one position to another; and a bearing assembly at the end of each roller to facilitate the rolling movement of the roller with respect to the support arms.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved adjustable rolling saw stand which has all the advantages of the prior art saw stands of a wide variety of designs and configurations and none of the disadvantages.

It is another object of the present invention to provide a new and improved adjustable rolling saw stand which may be easily and efficiently manufactured and marketed.

It is further object of the present invention to provide a new and improved adjustable rolling saw stand which is of durable and reliable constructions.

An even further object of the present invention is to provide a new and improved adjustable rolling saw stand which is susceptible of a low cost of manufacture with regard to both materials and labor, and which accordingly is then susceptible of low prices of sale to the consuming public, thereby making such adjustable rolling saw stand economically available to the buying public.

Still yet another object of the present invention is to provide a new and improved adjustable rolling saw stand which provides in the apparatuses and methods of the prior art some of the advantages thereof, while simultaneously overcoming some of the disadvantages normally associated therewith.

Still another object of the present invention is to support a large piece of material to be cut by a saw on a stand wherein rollers at the ends of arms are used for allowing easy handling of the material to be cut and, in an other orientation, employing such rollers for transporting the stand.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
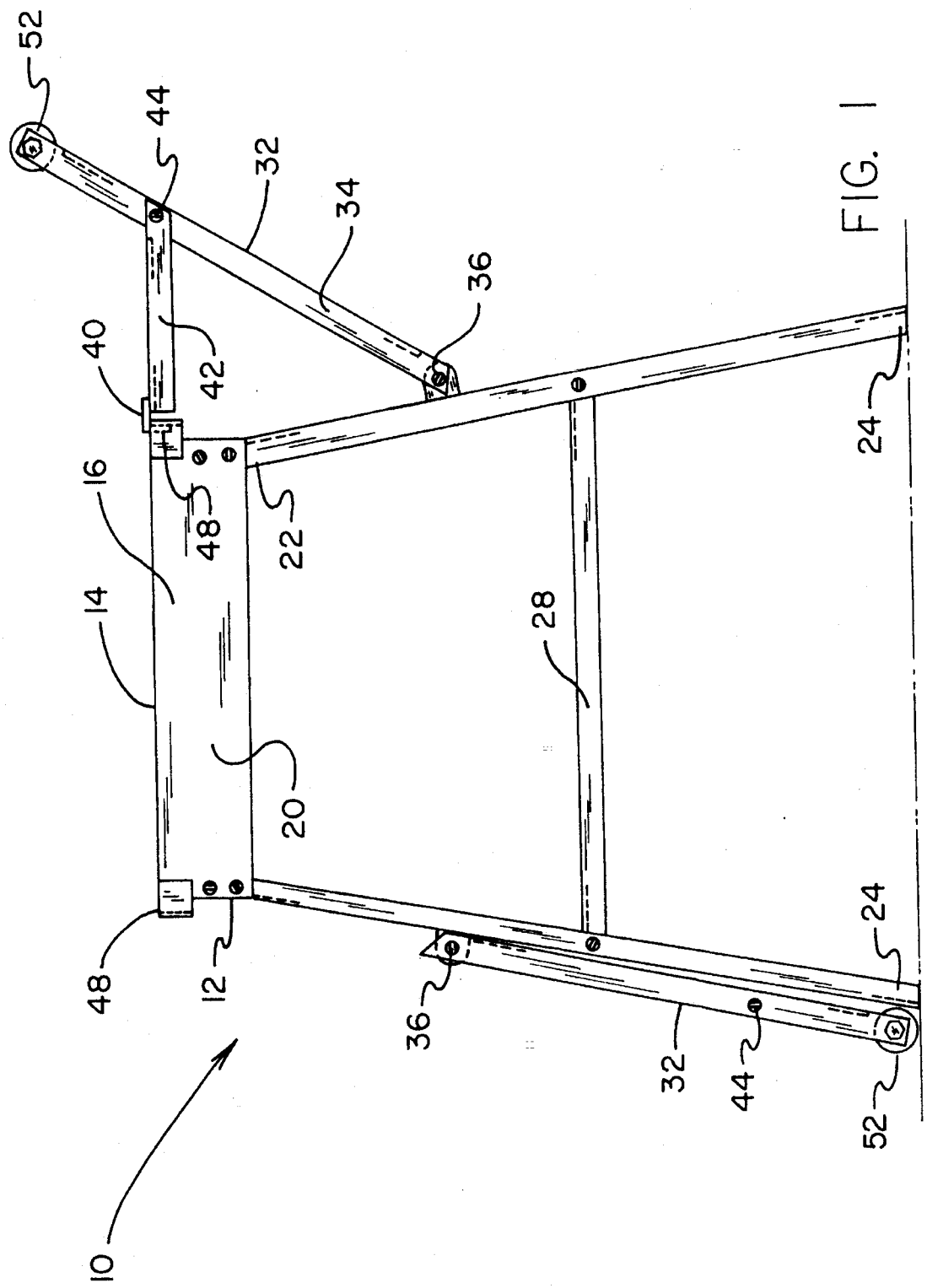
FIG. 1 is a side elevational view of the preferred embodiment of the adjustable rolling saw stand constructed in accordance with the principles of the present invention.
Figure 2:
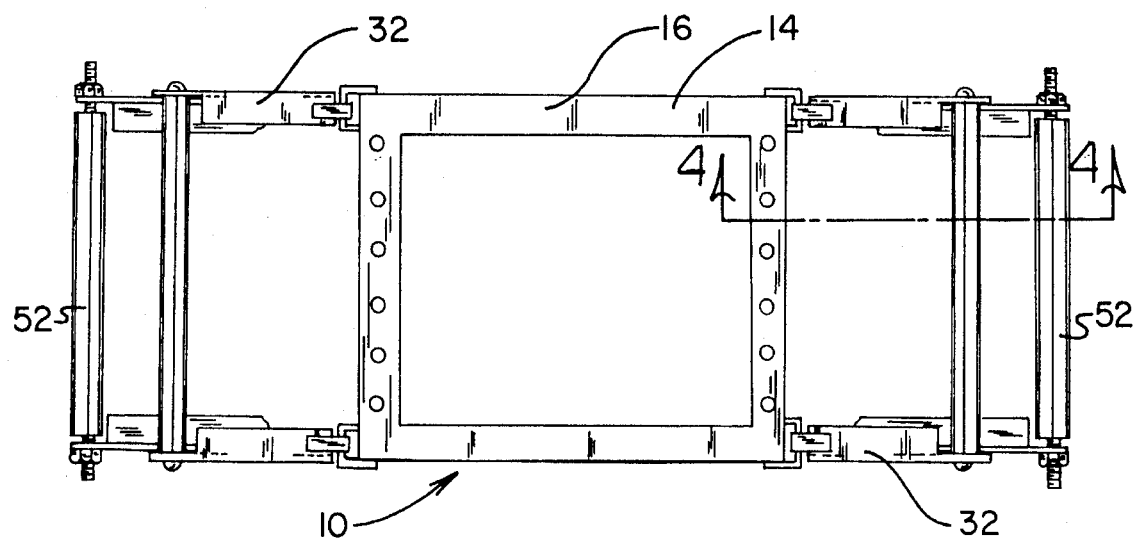
FIG. 2 is a top elevational view of the device shown in FIG. 1.
Figure 3:
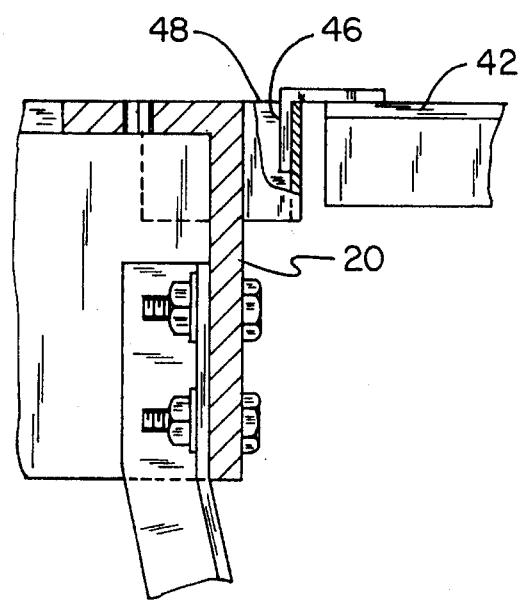
FIG. 3 is a cross sectional view of the stand taken along the line of removable coupling between the body of the stand and an adjustable arm.

With reference now to the drawings, and in particular to FIG. 1 thereof, the preferred embodiment of the new and improved adjustable rolling saw stand embodying the principles and concepts of the present invention and generally designated by the reference numeral 10 will be described.

The invention, an improved adjustable rolling saw stand is comprised of a plurality of components. In their broadest context, such components include a stand, a support assembly, a locking assembly, rollers, and a bearing assembly. Such components are specifically configured and correlated with respect to each other so as to attain the desired objective.

The central component of the system 10 of the present invention is a stand 12. The stand has a planar upper surface 14 constituting a base 16. The base is for the removable receipt of a saw to be used for cutting material on the base.

The upper surface of the stand is formed in a rectangular configuration. It has a short downwardly extending peripheral skirt 20. The skirt is in a rectangular configuration like the periphery of the base. In addition, a plurality of legs are secured with respect to the base and skirt. The legs have upper ends 22 and lower ends 24. The upper ends are secured to the base and skirt. The lower legs are positionable with its lower ends on the ground.

Greater rigidity to the stand is provided through a plurality of cross rods 28. The cross rods are secured at their ends in a rectangular configuration at intermediate points of the legs. The greater securement to the legs provides for additional support to the stand.

Figure 4:
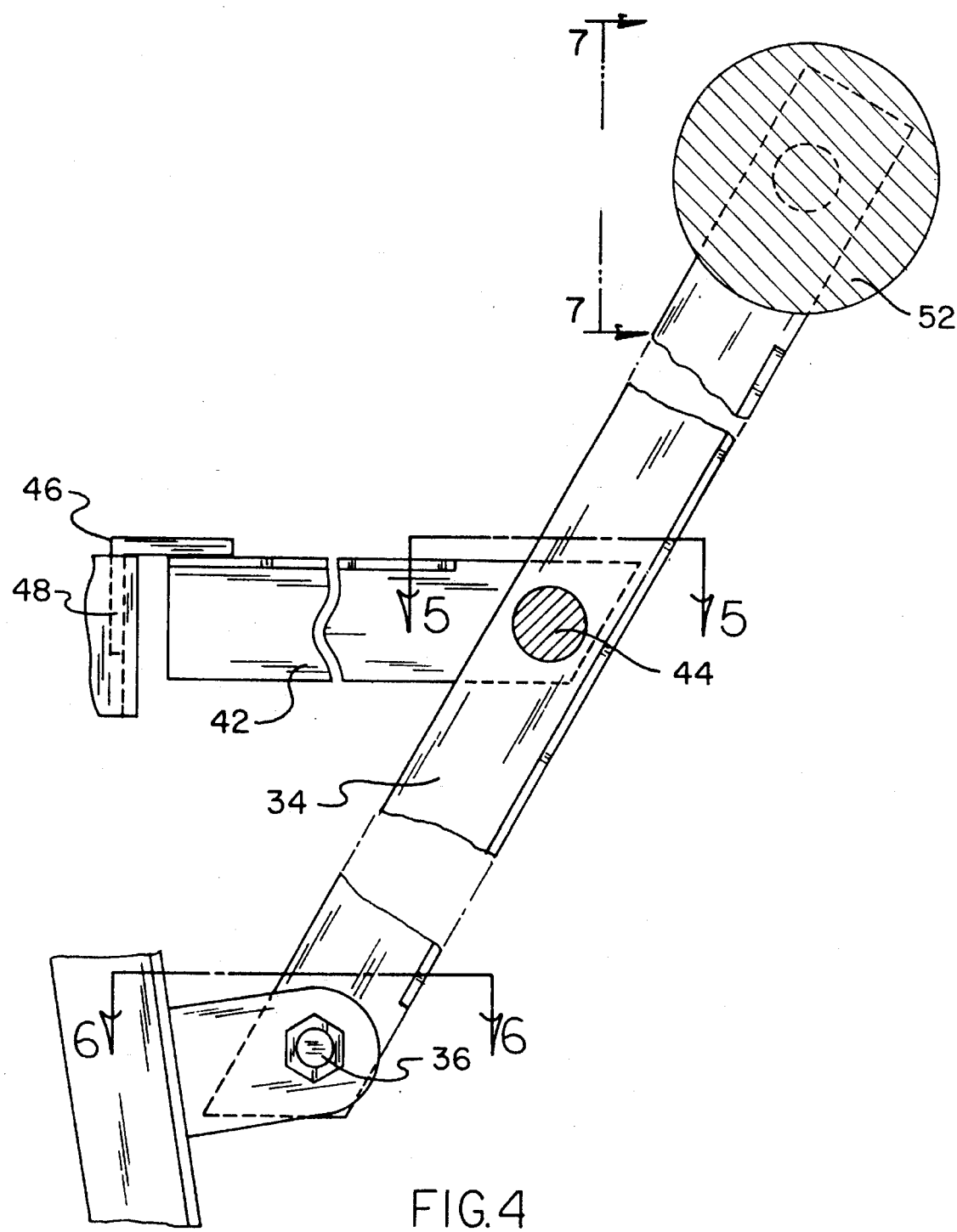
FIG. 4 is a cross sectional view taken along line 4—4 of FIG. 2.
Figure 5:
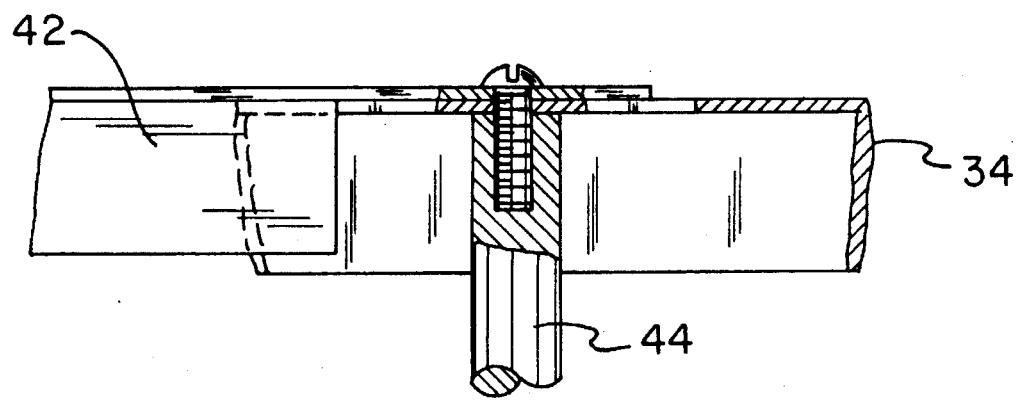
FIG. 5 is a cross sectional illustration taken along line 5—5 of FIG. 4.
Figure 6:
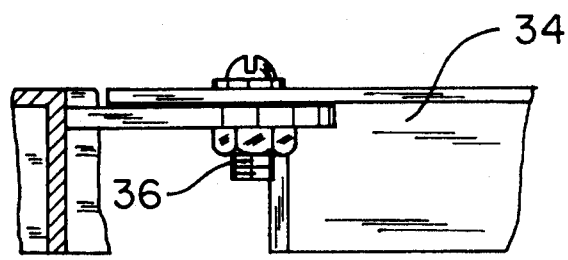
FIG. 6 is a cross sectional illustration taken along line 6—6 of FIG. 4.
Figure 7:
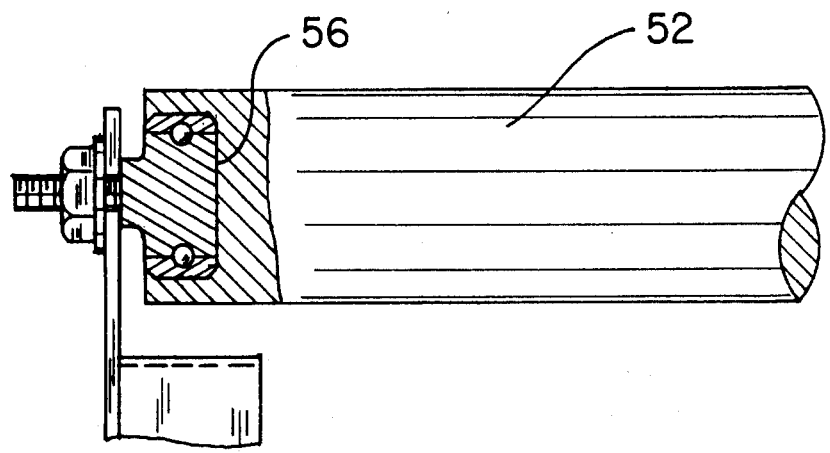
FIG. 7 is a cross sectional view taken along line 7—7 of FIG. 4.

Next provided is a support assembly 32. Similar support are located on opposite sides of the base. Each support assembly has a pair of pivot arms 34. The pivot arms are secured by pivots 36 at their inboard ends to an adjacent pair of legs. The legs are coupled to the pivot arms at an intermediate extent along their length. The pivot arms are thus adapted for movement between an elevated operative position as shown on the right of FIG. 1 and in FIG. 4. They are also movable to a lower depending position. Note the left side of FIG. 1.

Next provided is a locking assembly 40. A similar locking assembly is located on each side of the base. Each locking assembly is associated with a support assembly. Each locking assembly has a pair of locking arms 42. Each pair of locking arms has exterior ends. The exterior ends are secured by pivots 44 to an intermediate extent of an associated pivot arm. A support rod couples the locking arms at intermediate points therebetween. The locking arms also have interior ends with hooks 46. Such hooks are adapted to couple with receiving slots 48 formed and secured to the adjacent corners of the base. Such locks are for receiving the hooks when the pivot arms are in the elevated position. The hooks are removed from the slot for the removal thereof when the pivot arms are in the lower position.

A pair of rollers 52 are next provided. Each roller is secured between the exterior ends of each pair of pivot arms. In this manner, when the pivot arms are in the elevated position, the rollers may be used for supporting material to be cut. This is to assist the user in the handling of the material, particularly when of a large size of heavy weight. In addition, when the pivot arms are in the lower position as shown on the left side of FIG. 1, such rollers are adapted to contact and rest on the floor beneath the lower ends of the legs. This is to assist in the rolling of the device from one position to another. In such position, note is taken that the length of the pivot arms and rollers at the exterior ends thereof are of a greater length than the lower end of the legs beneath the pivot coupling between the legs and the pivot arms.

The last component of the system 10 is a bearing assembly 56. A similar bearing assembly is located at the end of each roller. This is to facilitate the rolling movement of the roller with respect to the support arm when in operation and use either for moving material to be cut or when repositioning the device with the pivot arms down.

The present invention is designed to facilitate the cutting of large panel sections or long boards without assistance from a second party. The stand itself is conventional and resembles a table with outwardly angled legs to form a stable base. The saw is centrally mounted on the top surface of the stand. A prototype has been built and is in use. This particular model accommodates a power miter saw, but the stand can easily be adapted to other types of saws. The stand is made from sturdy lightweight aluminum for ease in moving and manipulation.

One innovation in this stand is the incorporation of adjustable support arms at either end of the stand. These arms extend from the legs of the stand at either end, and they are hinge mounted to the legs at the midpoint. They are secured to the top of the stand by pivoting adjustable arms that have a hook at the end, and these fasten to holes in the top of the table. There is a wide roller that is mounted between the top ends of the arms on both sides of the stand. When the arms are disengaged and rotated down to the floor they can be used to help roll the stand to another location or into a truck for transportation.

The table top has a series of holes along each edge to accommodate different types of saws. The present invention would be a valuable acquisition for carpenters and homeowners who work on a lot of woodworking projects.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved adjustable rolling saw stand comprising, in combination:

a stand having a planar upper surface constituting a base for the removable receipt of a saw to be used for cutting material, the upper surface being formed in a rectangular configuration with a short downwardly extending peripheral skirt in a rectangular configuration, a plurality of legs secured at their upper ends to the surface and skirt and lower ends positionable on the ground, a plurality of cross rods secured in a rectangular configuration at intermediate points of the legs to couple the legs for additional support;

a support assembly located on opposite sides of the base, each support assembly having a pair of pivot arms pivotally secured at their inboard ends to an adjacent pair of legs at an intermediate extent thereof for movement between an elevated operative position and a lower depending position;

a locking assembly located on each side of the base, each locking assembly having a pair of locking arms for each support assembly with each pair of locking arms having exterior ends pivotally secured to an intermediate extent of the pivot arms with a support rod therebetween, the locking arms having interior ends with hooks with receiving slots secured to adjacent corners of the base for receiving the hooks when the pivot arms are in the elevated position and for removal thereof when the pivot arms are in the lower position;

a pair of rotatable rollers, each roller secured between the exterior ends of each pair of pivot arms whereby, when the pivot arms are in the elevated position, the rollers may be used for supporting material to be cut to assist a user in the handling thereof, and when the pivot arms are in the lower position, the rollers are adapted to rest on a floor beneath the lower ends of the legs to assist in the rolling of the device from one position to another; and a bearing assembly at the end of each roller to facilitate the rolling movement of the roller with respect to the support arms.

\* \* \* \* \*